United States Patent [19]

Marsee

[11] B 3,996,907

[45] Dec. 14, 1976

[54] FUEL INDUCTION SYSTEM

[75] Inventor: Frederick J. Marsee, Clawson, Mich.

[73] Assignee: Ethyl Corporation, Richmond, Va.

[22] Filed: Aug. 20, 1974

[21] Appl. No.: 498,951

[44] Published under the second Trial Voluntary Protest Program on March 2, 1976 as document No. B 498,951.

[52] U.S. Cl. .......................... 123/122 AC; 165/52; 123/127

[51] Int. Cl.$^2$ ........................................ F02M 31/00

[58] Field of Search ...... 123/122 AC, 52 MV, 127, 123/133; 165/52 R, 122 AB

[56] References Cited

UNITED STATES PATENTS

| | | | |
|---|---|---|---|
| 1,854,298 | 4/1932 | Godward | 123/122 AC |
| 3,037,493 | 6/1962 | Burch | 123/52 MV |
| 3,717,131 | 2/1973 | Chana | 123/52 MV |
| 3,809,032 | 5/1974 | Morris | 123/52 MV |

*Primary Examiner*—Charles J. Myhre
*Assistant Examiner*—R. H. Lazarus
*Attorney, Agent, or Firm*—Donald L. Johnson; Robert A. Linn; Joseph D. Odenweller

[57] ABSTRACT

A fuel induction system for a spark-ignited multicylinder internal combustion gasoline engine in which the primary barrel of the carburetor is connected to an inlet in the top of a container which is fitted through an opening in an exhaust gas conduit such that the lower portion of the container extends into the region of hot exhaust gas. An outlet in the top of the container connects to the engine intake manifold. The system gives improved air/fuel mixing and vaporization and improved cylinder-to-cylinder fuel distribution.

15 Claims, 6 Drawing Figures

FUEL INDUCTION SYSTEM

BACKGROUND

Of recent years there has been a trend toward operating spark-ignited internal combustion engines at leaner air/fuel ratios in order to decrease the amount of hydrocarbon and carbon monoxide in the exhaust. One limiting factor in going towards leaner operation is gasoline maldistribution from cylinder-to-cylinder. The inducted air/fuel ratio must be kept lean enough such that the cylinder supplied with the leanest mixture will still fire, otherwise exhaust hydrocarbon and carbon monoxide emission will increase rather than decrease. The problem is most acute when the choke is first moved to the open or off position because, at that time, the carburetor and associated hardware are not up to operating temperature and much of the inducted gasoline remains in liquid form causing excessive maldistribution.

Several methods have been proposed to minimize the problem. According to one method the entire intake manifold on which is mounted the primary venturi carburetor is heated by providing an exhaust gas jacket around the intake manifold (Bartholomew, "Potentialities of Emission Reduction by Design of Induction Systems," S.A.E. Meeting January 1966, Detroit, Michigan). According to another method a "hot spot" is provided in the intake manifold directly below the primary venturi. This is accomplished by having a thin sheet metal plate separate the exhaust cross-over from the intake manifold at this location (W. D. Bond, "Quick-Heat Intake Manifolds for Reducing Cold Engine Emissions," S.A.E. Meeting October 1972, Tulsa, Oklahoma). Both of these methods are effective but do not eliminate the problem.

Other related induction systems resulting from a prior art search and listed in chronological order are:

Kambak, U.S. Pat. No. 1,479,547 (1924) which discloses an induction system in which liquid fuel is delivered into a bulbous chamber located in the exhaust manifold. The liquid fuel is vaporized and then mixed with air which is inducted through separate means.

Maroger, Fr. Pat. No. 629,582 (1926) which discloses an exhaust-jacketed heat exchanger placed between the carburetor and the engine intake.

Mock, U.S. Pat. No. 1,777,472 (1930) which employs a thin wall "hot spot" in the carburetor adjacent to the power jet to assist in vaporization of excess gasoline inducted during acceleration.

Duthoit, U.S. Pat. No. 2,066,720 (1937) which discloses an updraft carburetor in which the air/fuel mixture is conducted through a bulbous conduit which extends transversely through the exhaust manifold.

Titus, U.S. Pat. No. 2,720,197 (1955) which discloses a liquid-heated heat exchanger installed between the carburetor and the intake manifold.

Summers, U.S. Pat. No. 3,016,051 (1962) disclosing a two-barrel induction system for a V-type engine which includes a U-tube which connects the two separate branches of the intake manifold. The U-type extends into the exhaust cross-over.

SUMMARY OF THE INVENTION

Fuel maldistribution in a multicylinder engine is significantly reduced by inducting the air/fuel mixture from a primary carburetor barrel into a box-like container which is fitted into an opening in the side wall of an exhaust conduit which is adapted to hold the container such that the lower portion extends into the exhaust flow. The container connects through one or more outlets to the intake manifold. Air/fuel mixtures inducted into the container are thoroughly mixed prior to induction into the intake manifold, thus insuring uniform air/fuel ratios at each cylinder. The system is especially useful with induction systems having two primary barrels and two sets of intake passages in the intake manifold.

DESCRIPTION OF THE PREFERRED EMBODIMENT

A preferred embodiment of this invention is a fuel induction system for a spark-ignited multicylinder internal combustion engine comprising in combination a carburetor, an intake manifold, an exhaust gas conduit and an evaporation container having an inlet and an outlet, said exhaust gas conduit having an opening in its side wall adapted to sealably engage and hold said evaporation container such that a non-perforate portion of said container extends into said exhaust conduit, said carburetor having at least one primary barrel wherein gasoline is atomized into air to form a primary air/fuel mixture, first passage means connecting said primary barrel to said container inlet adapted to deliver said primary air/fuel mixture into said container, and second passage means connecting said container outlet to said intake manifold adapted to deliver said primary air/fuel mixture from said container into said intake manifold.

Figure 1:
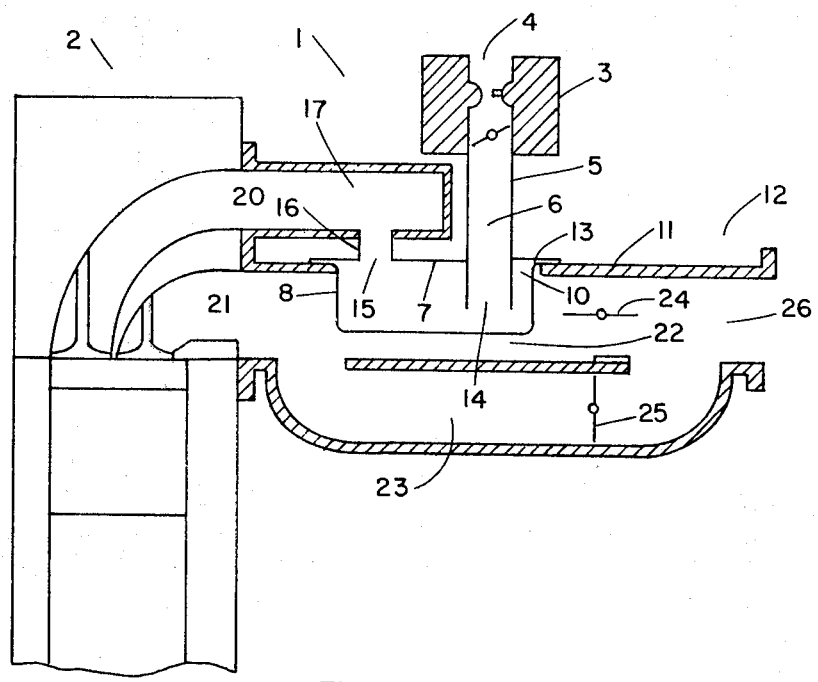
FIG. 1 is a cross-section of a fuel induction system of a multicylinder in-line engine.

FIG. 1 embodies the above fuel system. Fuel induction system 1 is mounted on multicylinder engine 2. System 1 comprises carburetor 3 which has a primary barrel 4 connected through conduit 5 down through inlet 6 in top closure 7 of container 8, which is constructed of sheet metal. Container 8 fits through an opening 10 in the side wall 11 of exhaust manifold 12. Opening 10 sealably engages container 8. Flanges 13 prevent container 8 from dropping into exhaust manifold 12. Conduit 5 opens 14 inside container 8.

Outlet 15 connects through conduit 16 into intake manifold 17 of engine 2. The intake manifold is connected to each intake opening 20 of engine 2.

Exhaust manifold 12 is connected to each exhaust port 21 of engine 2. The non-perforate lower portion of container 8 extends into exhaust passage 22 within manifold 12. By-pass 23 forms an alternate exhaust passage which does not contact container 8. Interlocked valves 24 and 25 control exhaust flow through exhaust passage 22 and by-pass 23. Exhaust outlet 26 is adapted to connect to a conventional exhaust system.

In operation, the engine is started drawing air down barrel 4 forming an air/fuel mixture which passes down conduit 5 into container 8. The extreme turbulence in container 8 thoroughly mixes the air and fuel and the heat from the hot exhaust gas contacting the bottom and sides of container 8 vaporizes any liquid in the mixture. The uniform mixture then passes up outlet 15 through conduit 16 into intake manifold 17 which distributes it to the intake openings 20 of engine 2. After the engine becomes hot, by-pass valve 25 opens and valve 24 closes, reducing the amount of heat on container 8, although still maintaining its mixing effect.

Figure 2:
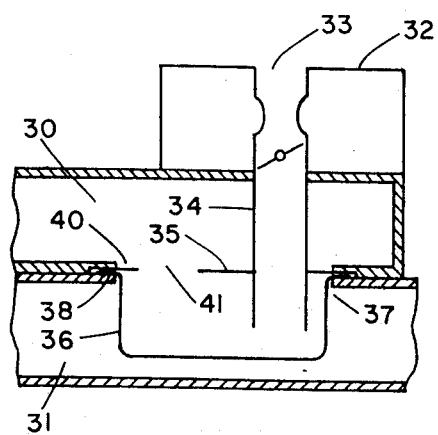
FIG. 2 is a cross-section of a carburetor mounted directly on an intake manifold which adjoins an exhaust manifold.

FIG. 2 shows an embodiment in which intake manifold 30 adjoins exhaust manifold 31. Carburetor 32 is mounted on intake manifold 30. Primary barrel 33 connects through conduit 34 through top closure 35 into container 36. Container 36 is made of sheet metal and fits snugly through opening 37 in the top wall of exhaust manifold 31; such that the non-perforate bottom and side walls of container 36 extend into the interior of exhaust manifold 31. Flange 38 prevents container 36 from dropping into manifold 31. Top closure 35 seals against flange 38.

Intake manifold 30 adjoins the top surface of exhaust manifold 31 and has an opening 40 in its bottom wall in the area where it adjoins top closure 35; such that top closure 35 forms the bottom of intake manifold 30 in the area directly over container 36. Container 36 connects through outlet 41 in top closure 35 to intake manifold 30.

In operation, the engine is started and air is drawn down barrel 33 in which gasoline is atomized in the venturi section forming an air/fuel mixture. The air/fuel mixture passes down conduit 34 through top closure 35 into container 36 in which it is thoroughly mixed and heated by exhaust passing through exhaust manifold 31.

The homogenous air/fuel mixture passes up through opening 41 into intake manifold 30, from where it is distributed to the intake openings of the various cylinders.

Figure 3:
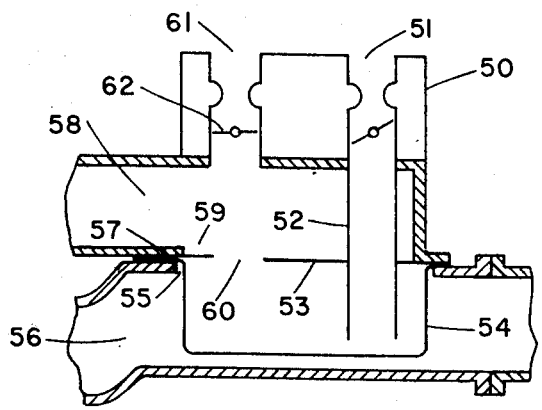
FIG. 3 is a cross-section similar to that of FIG. 2 but including a secondary barrel in the carburetor.

FIG. 3 shows an embodiment in which the carburetor includes both primary and secondary barrels. Carburetor 50 includes primary barrel 51 which connects through conduit 52 through top closure 53 into container 54. Container 54 is fitted through opening 55 in the top wall of exhaust manifold 56. Flange 57 seals against the exhaust manifold top wall. Intake manifold 58 is clamped against the top of exhaust manifold 56 and seals along the portion of top closure 53, which overlays 57. There is an opening 59 in the bottom of intake manifold 58 in the area directly over top closure 53, such that top closure 53 forms the bottom of intake manifold 58. Outlet 60 forms a passage from container 54 into intake manifold 58. Secondary barrel 61 connects directly to intake manifold 58 at a location directly above outlet 60. Secondary throttle valve 62 is located in barrel 61 below the venturi section.

In operation, when the engine starts air is inducted into the primary barrel 51 forming an air/fuel mixture which is conducted through conduit 52 into container 54. Extreme turbulence in container 54 thoroughly homogenizes the air/fuel mixture and heat transferred through the thin sheet metal walls of container 54 from exhaust gas in exhaust manifold 56 aids in vaporizing any liquid droplets.

The uniform air/fuel mixture passes up through outlet 60 into intake manifold 58 which delivers the air/fuel mixture to each cylinder.

At high engine loads, throttle valve 62 opens and supplemental secondary air/fuel mixture is inducted through secondary barrel 61. Due to its location, directly above outlet 60, the downcoming secondary air/fuel mixture impinges the upflowing primary air/fuel mixture. This further assists the mixing and insures a uniform air/fuel mixture.

Figure 4:
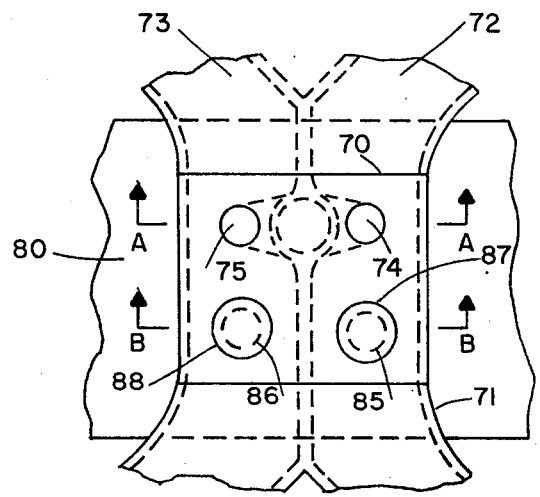
FIG. 4 is a top view of a four-barrel carburetor mounted directly on the intake manifold which overlays the exhaust cross-over of a V-type multicylinder engine.
Figure 5:
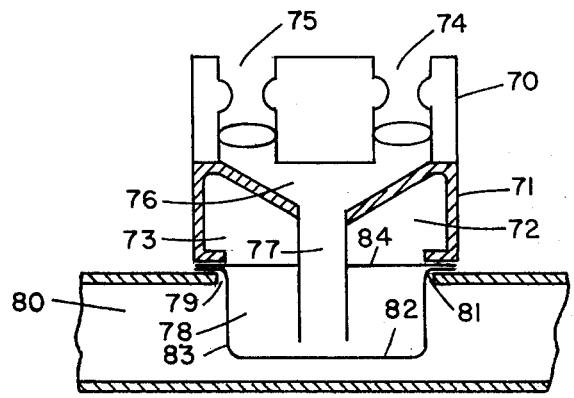
FIG. 5 is a cross-section taken at AA through the primary barrels of the four-barrel carburetor.
Figure 6:
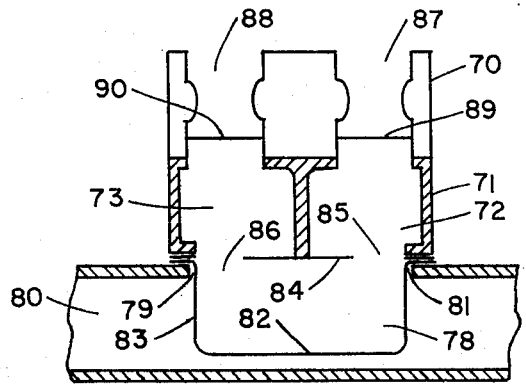
FIG. 6 is a cross-section taken at BB through the secondary barrels of the four-barrel carburetor.

FIGS. 4, 5 and 6 show an embodiment of the invention applied to a V-type engine having a four-barrel carburetor. Corresponding numbers designate the same part in the various figures. Carburetor 70 is mounted on intake manifold 71, which has two sets of intake passages 72 and 73, each connected to deliver air/fuel mixture to one-half of the cylinders. Primary barrels 74 and 75 connect through passage 76 and conduit 77 through top closure 84 into container 78. Container 78 fits through an opening in the top of exhaust cross-over 80. Flange 81 prevents container 78 from dropping into exhaust cross-over 80. The non-perforate bottom 72 and side walls 83 of container 78 extend into exhaust cross-over 80.

Outlet 85 forms a passage from container 78 into intake passage 72. Outlet 86 forms a passage from container 78 into intake passage 73. Secondary barrels 87 and 88 connect directly into intake passages 72 and 73, respectively.

Secondary throttle valves 89 and 90 control fluid flow in barrels 87 and 88. In operation, when the engine starts air is inducted through primary barrels 74 and 75, forming an air/fuel mixture which is conducted through passage 76 and conduit 77 into container 78. Extreme turbulence in container 78 forms a uniform mixture. Heat transferred through bottom of 76 and side walls 73 from exhaust cross-over 80 vaporizes any liquid droplets in the air/fuel mixture.

The uniform air/fuel mixture then passes upward through outlets 85 and 86 into intake passages 72 and 73 which deliver the uniform air/fuel mixture to each of the cylinders.

Under high load, throttle valves 89 and 90 open to supply supplemental secondary air/fuel mixture directly to intake passages 75 and 73. Because of the location of secondary barrels 87 and 88, directly over outlets 85 and 86, the primary and secondary air/fuel mixtures impinge in intake passages 72 and 73 insuring good mixing.

An important feature of this embodiment in which there are two primary barrels and two sets of separate intake passages is that both primary barrels deliver air/fuel mixture to the same container. In the event that the primary barrels are unbalanced this is compensated for and a uniform air/fuel mixture is delivered to both sets of separate intake passages.

In practice, it has also been found that air leaks by the secondary throttle valves even when closed. If the secondary barrels do not open into the intake passages at the same location longitudinally with respect to the intake passages, then the air/fuel mixture going to the forward cylinders will differ from that going to the after cylinders. Thus, another important feature is the location of the secondary barrels directly above the outlets from the container into the intake passages.

I claim:

1. A fuel induction system for a spark-ignited multi-cylinder internal combustion engine comprising in combination a carburetor, an intake manifold, an exhaust gas conduit and an evaporation container having an inlet and an outlet, said exhaust gas conduit having an opening in its side wall adapted to sealably engage and hold said evaporation container such that a non-perforate portion of said container extends into said exhaust conduit, said carburetor having at least one primary barrel wherein gasoline is atomized into air to form a primary air/fuel mixture, first passage means connecting said primary barrel to said container inlet adapted to deliver all of said primary air/fuel mixture into said container, and second passage means connecting said container outlet to said intake manifold adapted to deliver said primary air/fuel mixture from said container into said intake manifold.

2. A fuel induction system of claim 1 wherein said carburetor has at least one secondary barrel, said secondary barrel being connected to and adapted to deliver supplemental air/fuel mixture to said intake manifold during periods of high engine load.

3. A fuel induction system of claim 2 wherein said secondary barrel is connected to said intake manifold at a location that is the same longitudinally as the location at which said second passage means connects to said intake manifold.

4. A fuel induction system of claim 1 adapted for use with a V-type engine wherein said intake manifold is divided into two sets of intake passages, each of said sets being connected to and adapted to deliver an air/fuel mixture to one-half of said multicylinders, first passage means connecting said primary barrel to said container adapted to deliver all of said primary air/fuel mixture into said container, and second passage means connecting said container to each of said two sets of intake passages whereby each of said two sets of intake passages receives the same air/fuel mixture.

5. A fuel induction system of claim 4 having two secondary barrels in said carburetor, each of said secondary barrels being connected to and adapted to deliver supplemental air/fuel mixture to a different one of said two sets of intake passages.

6. A fuel induction system of claim 5 wherein the location in said two sets of intake passages at which said secondary barrels connect is the same longitudinally as the location at which said second passage means connect to said two sets of intake passages.

7. A fuel induction system of claim 6 wherein said carburetor has two primary barrels, each of said primary barrels being connected through first passage means to said container to deliver all of said primary air/fuel mixture into said container.

8. A fuel induction system of claim 1 wherein said first passage means connects said primary barrel downwardly to said container and said second passage means connects said container upwardly to said intake manifold whereby said container forms a sink for unvaporized gasoline.

9. A fuel induction system of claim 8 adapted for use with a V-type engine having an exhaust cross-over, an opening in the top of said exhaust cross-over adapted to sealably engage and hold said container such that the non-perforate portion of said container extends down into said exhaust cross-over, the top closure of said container being substantially flush with the top of said exhaust cross-over, said inlet and said outlet being located in said top closure, said intake manifold being located above and adjoining said top closure, said intake manifold having an opening in its bottom wall in the area where it adjoins said top closure, said opening sealably engaging said top closure such that said top closure forms the bottom of said intake manifold in said area, said carburetor being located above said intake manifold, said primary barrel being connected by first passage means downwardly to said container inlet in said top closure, said outlet in said top closure forming said second passage means from said container into said intake manifold.

10. A fuel induction system of claim 9 wherein said carburetor has at least one secondary barrel connected to and adapted to deliver supplemental air/fuel mixture to said intake manifold during periods of high engine load, said secondary barrel being connected to said intake manifold at a location above said outlet in said top closure such that primary air/fuel mixture passing upwardly through said outlet into said intake manifold impinges against any fluid entering said intake manifold downwardly through said secondary barrel.

11. A fuel induction system of claim 9 wherein said intake manifold is divided into two sets of intake passages, each of said sets being connected to and adapted to deliver an air/fuel mixture to one-half of said multicylinders, said top closure having two outlets, each of said outlets forming second passage means to a different one of said sets of intake passages.

12. A fuel induction system of claim 11 having two secondary barrels in said carburetor, each of said secondary barrels being connected to and adapted to deliver a supplemental air/fuel mixture to a different one of said sets of intake passages during periods of high engine load, said secondary barrels being connected to said sets of intake passages at a location above said outlets in said top closure such that primary air/fuel mixture passing upwardly through said outlets into said sets of intake passages impinges against any fluid entering said sets of intake passages downwardly through said secondary barrels.

13. A fuel induction system of claim 12 further characterized by having two primary barrels in said carburetor, each of said primary barrels being connected through said first passage means downwardly to said inlet in said top closure of said container.

14. A fuel induction system of claim 13 wherein said first passage means comprises passages connecting said two primary barrels to a common conduit, said common conduit connecting to said inlet in said top closure to deliver all of said primary air/fuel mixture into said container.

15. A fuel induction system of claim 1 having a top closure on said container, said top closure having an inlet opening connected to said primary barrel and an outlet opening connected to said intake manifold.

* * * * *